L. B. SWIFT.
CONTROLLING MECHANISM.
APPLICATION FILED SEPT. 6, 1917.
1,420,348.
Patented June 20, 1922.
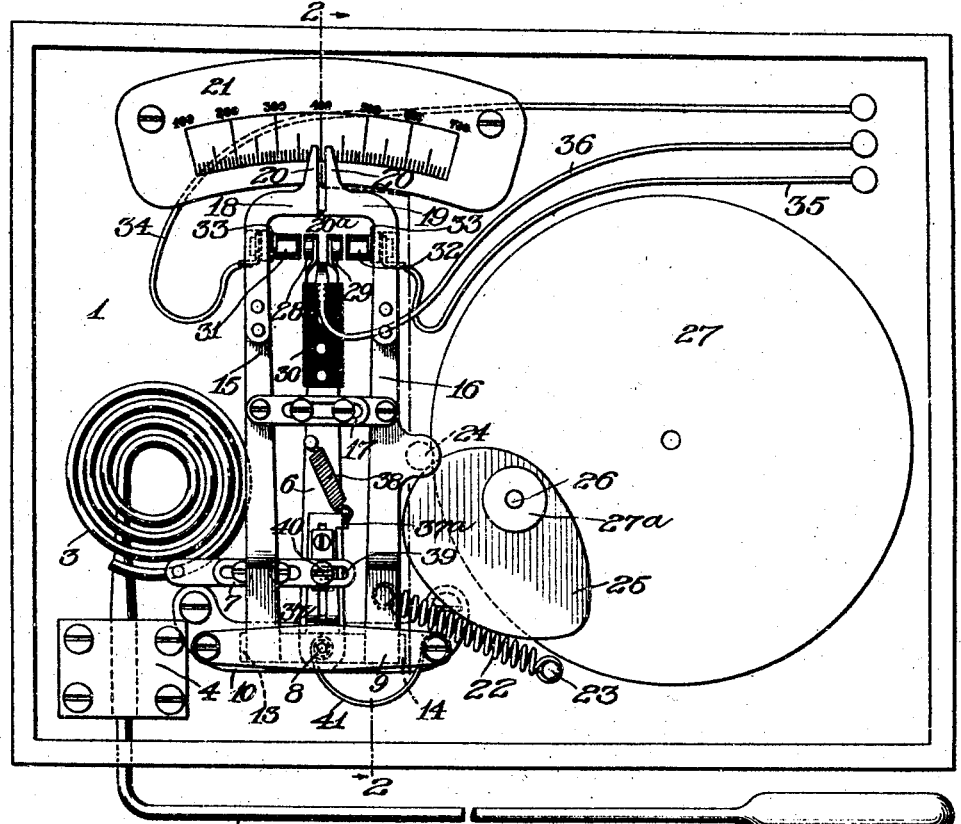
Fig. 1
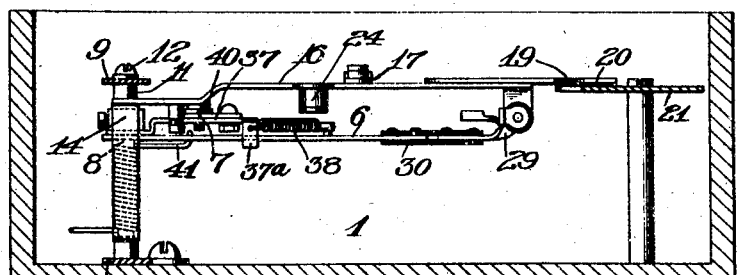
Fig. 2
Fig. 3
WITNESSES:
Francis Jerdone Jr
George H. Powell
INVENTOR
Lewis B. Swift
BY
his ATTORNEYS

UNITED STATES PATENT OFFICE.

LEWIS B. SWIFT, OF ROCHESTER, NEW YORK, ASSIGNOR TO TAYLOR INSTRUMENT COMPANIES, OF ROCHESTER, NEW YORK, A CORPORATION OF NEW YORK.

CONTROLLING MECHANISM.

1,420,348.    Specification of Letters Patent.    Patented June 20, 1922.

Application filed September 6, 1917. Serial No. 190,092.

*To all whom it may concern:*

Be it known that I, LEWIS B. SWIFT, of Rochester, in the county of Monroe and State of New York, have invented certain new and useful Improvements in Controlling Mechanism; and I do hereby declare the following to be a full, clear, and exact description of the same, reference being had to the accompanying drawings, forming a part of this specification, and to the reference numerals thereon.

My invention relates to a controlling mechanism and has for its object to provide an instrument particularly adapted for automatically controlling the temperature of retorts, or ovens, used for drying and baking, or other purposes wherein it is desired to gradually effect a change of temperature and maintain the same between certain limits within, or during, a given period of time, as is required in certain processes of manufacture. A further object of the invention is to provide in a controlling instrument a clock movement in combination with a circuit opening and closing mechanism for automatically controlling the operation of a heating medium in such manner that a gradual increase or decrease of temperature may be effected during a given period of time. To these and other ends the invention consists in certain improvements and combinations of parts, all as will be hereinafter more fully described, the novel features being pointed out in the claims at the end of the specification.

In the drawings:

Figure 1 is a view in elevation illustrating the preferred embodiment of the invention;

Figure 2 is a sectional view taken on line 2—2 of Figure 1, and

Figure 3 is a bottom plan view illustrating the support for the pivotal arms shown in Figure 1.

Similar reference characters throughout the drawings indicate similar parts.

An instrument constructed in accordance with my present invention is adapted particularly for indicating and controlling the temperature of various heating units such as electric, gas, or steam heated ovens, or receptacles, in which it is desired to raise or lower the temperature gradually, as in the case of various processes of manufacture where certain articles should be subjected to a gradual increase, or decrease, of temperature for a definite period of time. The means by which the temperature is thus controlled comprises generally a circuit controlling member actuated by a heat sensitive element such as a capillary tube and operating between two contacts with which are connected circuit wires leading to a switch, or valve, controlling a supply of the medium adapted for heating an oven, or furnace, the movement of the arm serving to automatically open and close said circuits and the relative position of the contacts being controlled by a clock driven member such as a cam, whereby a time and temperature combination is effected so as to vary the temperature of the receptacle, or oven, or maintain it at the desired degree of temperature during a specified time.

In illustrating the present embodiment of my invention I have shown a temperature controlling instrument mounted in a casing 1 and comprising a heat sensitive element in the form of a Bourdon tube 3 supported within the casing by means of a clamping bracket 4 and connected to a capillary tube 2, which latter is preferably extended from the casing and provided on its outer end with a bulb 5 which may be inserted in a retort, or oven, or arranged in proximity to a heated chamber, or device, the temperature of which it is desired to control, or regulate. The tube 3 is, as usual, filled with a suitable expansive fluid such as mercury, and the active end thereof is operatively connected with the pivoted circuit controlling arm 6, by means of an adjustable connecting link 7. The arm 6 is rigidly mounted upon a shaft 8, the opposite ends of which are journaled in the front and back plates 9 and 10 respectively, the former being spaced from the latter by the thimbles 11 on the bolts 12, as shown in Figure 3. Pivoted upon the shaft 8 and extending upon opposite sides thereof are the U-shaped frame members 13 and 14 carrying the upright arms 15 and 16 respectively, which extend on opposite sides of the arm 6 and which are connected by the adjustable link 17, whereby the distance between the arms may be varied from time to time. The upper ends of the arms 15 and 16 are provided with inwardly projecting extensions 18 and 19, each terminating in a vertically disposed pointer 20, behind which is mounted a temperature scale 21, as shown in Figure 1. The adjacent edges of the pointers 20 are prevented from contacting by the projections 20$^a$, which are preferably formed of insulating material.

A spring 22 is connected at one end with the arm 16, and at the other end with the stud 23 on the casing, whereby the roller 24 on the arm 16 is held in contact with the cam 25 on the arbor 26 of a clock mechanism mounted in the casing 27, the cam being held in whatever position it is set upon the arbor by tightening the thumb nut 27$^a$. The cam 25 may be of any desired contour, and is rotated by the clock movement to control the movement of the arms 15 and 16 for a purpose which will hereinafter be explained.

The central arm 6 is provided at its upper end with contacts 28 and 29 insulated from the arm by the strips 30, while the arms 15 and 16 are provided with the maximum and minimum contacts 31 and 32 respectively, insulated from said arms by the washers 33. Connected with each of the contacts 31 and 32 are the conductors 34 and 35 respectively, while the contacts 28 and 29 are connected with the conductor 36, said conductors being arranged to be connected with any suitable type of electrically operated valve, or switch, (not shown), for controlling the supply of a heating medium such as steam, gas, or electricity, to a receptacle such as a steam, gas, or electrically heated retort, furnace, or oven.

In order to prevent straining the sensitive coil 3 when the contact 29 engages the contact 32, I provide an auxiliary arm 37 pivoted upon the shaft 8, which is connected with the central arm 6 by means of a relatively light tension spring 38, whereby expansion of the coil 3 after said contacts are closed will not cause injury to the instrument. The arm 37 is limited in its movement toward the coil by means of a projection 37$^a$, which normally engages the arm 6, as shown in Figure 1. When the coil 3 has contracted sufficiently to cause the contact 28 to engage contact 31 in whatever position the arms 15 and 16 may be in, said coil is free to continue to close without further movement to the left of the arm 6, as the link 7 is provided with an elongated slot 39 to receive the stud 40 of the arm 37 so that the link may slide upon the stud when the coil is closing, irrespective of whether or not contact 28 is held by contact 31.

A spring 41 coiled about the shaft 8 and secured at one end to one of the posts 12 has its other end connected with arm 6 and tends to move arm 6 toward the left as seen in Figure 1 so that the stud 40 thereof is maintained in contact with link 7 at the left hand end of slot 39 therein and lever 6 is thereby made to follow the contracting movement of tube 3.

In the operation of my improved instrument the pointers 20 may by means of the adjustable link 17, be set apart a distance corresponding to the number of degrees on the temperature scale it is desired to establish as a limit between which the circuits are opened and closed for operating the switches, or valves, of the ovens (not shown) which control the supply of steam, or current, for heating said ovens. In the present instance, as illustrated in Figure 1, the pointers are set apart a distance corresponding to 20° upon the scale, which means that for every change of 20° in temperature the arm 6 will be shifted by the coil 3 to open one of the circuits and close the other, thereby either turning on or off the supply of heating medium used for heating the ovens, or furnaces, as the case may be. Assuming that contact 28 engages contact 31, the switch (not shown) controlling the supply of the heating medium, or current, to the oven will be closed through wires 34 and 36, and the temperature of the oven will be increased as long as said contacts remain closed. As the temperature of the oven increases, the coil 3 will expand and cause the arm 6 to move to the right, thereby separating contacts 28 and 31 and closing contacts 29 and 32 at which time the switch opening circuit will be closed through wires 35 and 36 to throw the switch and discontinue the supply of heating medium to the oven; or in the case of a gas heated oven, the supply valve will be opened and closed by the opening and closing of the circuits as just explained. With the source of heat thus cut off coil 3 will begin to close and thus permit spring 41 to gradually move arm 6 to the left until circuit is again established through wires 34 and 36 by the closing of contacts 28 and 31. It is during these operations of opening and closing controlling circuits for the heating medium that the clock actuated means for gradually shifting the position of contacts 31 and 32 is effected by movement of the connected arms 15 and 16 and the temperature of the receptacle or oven raised or lowered the desired amount in a given period of time. By the use of cams of different contours the temperature of the receptacle may either be very gradually raised or lowered, or, if desired, the increase, or decrease, may be more quickly effected by the substitution of a cam, of the proper contour for quickening the movement of the arms 15 and 16 under the action of spring 22. It will thus be seen that a temperature control mechanism of the electric contact type combined with a clock, or other cam actuating movement, may be employed to automatically change the temperature control limits of the instrument so that any combination of time and temperature desired within the time and temperature limits of the instrument may be effected. The cam may, if desired, be provided with a curved edge, or segment, all points of which are equidistant from the center of the arbor 26, in which case the arms 15 and 16 will be held in fixed relation to the arm 6 for a given length of time, thereby maintaining an even temperature in the receptacle as long as this portion of the cam is in contact with the roller 24.

The temperature limits within which it is desired to have the instrument operate to bring the receptacle to a given temperature are, of course, so far as the element of time is concerned, controlled by the speed and contour of the cam, but so far as the intervals of time between which the oven controlling circuits are opened and closed enter into the combination, the distance which the maximum and minimum contacts 31 and 32 are spaced apart is the controlling factor. If the speed and contour of the cam are such as to cause the maximum contact 31 to move at the same speed as the coil or sensitive member moves the contact 28 when said coil is expanding, then the circuit which maintains the oven switch in a closed position will remain closed and the temperature of the oven raised to the maximum in a minimum amount of time. This merely illustrates a combination in the extreme and one which it may, or may not, be desirable to combine in an instrument of this kind. It will, therefore, be seen, however, that practically any combination of time and temperature desired may be secured in an instrument of this type.

While particularly designed for regulating the supply of a heating medium it will be understood that the circuits controlled by the instrument could in turn control the supply and exhaust of a refrigerator, or other medium, the supply and exhaust of which is dependent upon a condition determined in the present instance by a heat sensitive device, whether the latter is located at a distance and connection established by a bulb and capillary tube, as shown, or otherwise. It will be noted also that in the present instance the thermometric member is pressure operated, and, therefore, circuits could as well be controlled by variations in pressure even though not primarily inaugurated by temperature alone.

I claim as my invention:

1. In a controlling mechanism, the combination with a movable electric contact and pressure actuated means for moving the same, of an indicating scale, a pair of arms mounted for pivotal movement relative to each other and to said first mentioned contact and scale, electric contacts on said arms on opposite sides of said first contact, adjustable means connecting said arms for variably limiting the extent of movement of said first contact, pointers on said arms indicating the adjusted relative positions of the latter on said scale, and actuating means for moving said arms in unison to vary the range of movement of said first contact relative to said scale and to indicate the same thereon.

2. In a controlling mechanism, the combination with a movable electric contact and pressure actuated means for moving the same, of an indicating scale, a pair of arms movable about a single pivot relative to each other and to said first mentioned contact and scale, electric contacts on said arms on opposite sides of said first contact, a link adjustably connecting said arms for variably limiting the extent of movement of said first contact, pointers on said arms indicating the adjusted relative positions of the latter on said scale, and a time train for moving said arms in unison to vary the range of movement of said first contact relative to said scale and to indicate the same thereon.

3. In a temperature controlling mechanism, the combination with an indicating scale, a pair of arms mounted for pivotal movement relative to each other and to said scale, pointers on said arms movable therewith over said scale, opposed electrical contacts carried by said arms, means adjustably connecting said arms for movement in unison, time mechanism for moving said arms in unison, a pivotally mounted intermediate arm having a contact movable between said opposed contacts, temperature responsive means, a spring tending to move said intermediate arm in one direction under control of said temperature responsive means, and a yieldable connection between the latter and said intermediate arm for moving the same in the opposite direction.

4. In a temperature controlling mechanism, the combination with an indicating scale, a pair of arms mounted for pivotal movement relative to each other and to said scale, pointers on said arms movable therewith over said scale, opposed electrical contacts carried by said arms, means adjustably connecting said arms for movement in unison, time mechanism for moving said arms in unison, a pivotally mounted intermediate arm having a contact movable between said opposed contacts, temperature responsive means, a loose connection between said temperature responsive means and intermediate arm and a pair of springs for yieldably moving the latter under control of said temperature responsive means.

5. In a temperature controlling mechanism, the combination of a pair of relatively movable arms carrying opposed spaced electric contacts, a pivoted arm, a contact on said pivoted arm interposed between said first mentioned contacts and adapted to cooperate therewith, a temperature controlled member, a link connecting said temperature controlled member to said pivoted arm, and means for varying the space between said contacts to limit the movements of said pivoted arm.

6. In a temperature controlled mechanism, the combination with a movable electric contact and a temperature controlled member for actuating the same, of a temperature scale, a pair of movably mounted adjustably connected arms having pointers mounted in proximity to the scale, electric contacts on each of the arms at opposite sides of the first mentioned contact and in the path of the same, and means for effecting and controlling movement of said arms to cause the pointers to move back and forth over the scale.

7. In a temperature mechanism, the combination with a movable electric circuit contact and a temperature controlled member yieldingly connected therewith, of a temperature scale, a pair of spaced movable arms adjustably connected, each provided with a circuit contact in the path of the first mentioned contact and having extensions projecting over the scale and arranged to be set apart the number of degrees corresponding to the temperature control limits between which it is desired to have the circuit contacts open and close and means for effecting and controlling the movement of the spaced arms relatively to the first mentioned contact.

8. In a temperature controlling mechanism, the combination of a pair of pivoted contact members, a circuit closer movable in opposite directions to alternately engage the same, adjustable means connecting said pivoted contact members, pressure controlled means for actuating said circuit closer and a loose connection between said pressure means and circuit closer to permit the free expansion or contraction of said pressure means when the circuit closer has been actuated.

LEWIS B. SWIFT.